United States Patent

Shields et al.

[11] Patent Number: 6,086,198
[45] Date of Patent: *Jul. 11, 2000

[54] BLEED ALLEVIATION BETWEEN TWO INKS

[75] Inventors: James P. Shields, Philomath; John R. Moffatt, Corvallis, both of Oreg.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,555

[22] Filed: Feb. 1, 1996

[51] Int. Cl.⁷ .................................................. G01D 11/00
[52] U.S. Cl. ................................................ 347/100
[58] Field of Search .................... 347/100, 96; 106/20 D

[56] References Cited

U.S. PATENT DOCUMENTS

| | | | |
|---|---|---|---|
| 5,085,698 | 2/1992 | Ma et al. | 106/20 |
| 5,116,409 | 5/1992 | Moffatt | 106/22 |
| 5,133,803 | 7/1992 | Moffatt | 106/25 |
| 5,143,546 | 9/1992 | Yuasa et al. | 106/20 |
| 5,207,824 | 5/1993 | Moffatt et al. | 106/22 R |
| 5,271,959 | 12/1993 | Bober et al. | 427/155 |
| 5,320,668 | 6/1994 | Shields et al. | 106/20 R |
| 5,356,464 | 10/1994 | Hickman et al. | 106/20 R |
| 5,428,383 | 6/1995 | Shields et al. | 347/96 |
| 5,486,397 | 1/1996 | Gordon et al. | 428/76 |
| 5,518,534 | 5/1996 | Pearlstine et al. | 106/20 R |
| 5,543,177 | 8/1996 | Morrison et al. | 427/288 |
| 5,555,008 | 9/1996 | Stoffel et al. | 347/100 |
| 5,626,654 | 5/1997 | Breton et al. | 106/31.33 |

FOREIGN PATENT DOCUMENTS 57-90070 6/1982 Japan.

*Primary Examiner*—N. Le
*Assistant Examiner*—Michael S Brooke

[57] ABSTRACT

Certain colorants which include both dye and pigment based inks are used which become insoluble under specific and well-defined conditions and additives. By reacting a quaternized or neutralized amine dispersant in a pigment-containing ink with an anion in a second ink that quantitatively combines with the dispersant, the pigment dispersion is destabilized, resulting in inhibition of the migration of pigment on the print medium, thereby helping to reduce bleed between black ink and color inks and between different color inks.

25 Claims, 1 Drawing Sheet

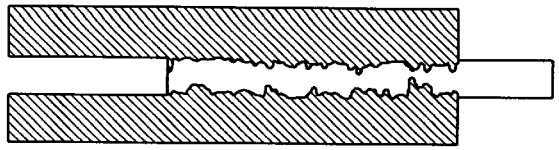
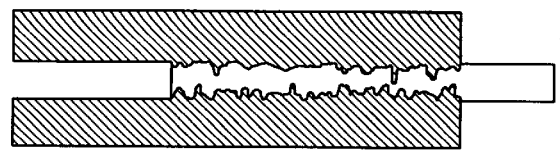
Fig. 1a                Fig. 1b
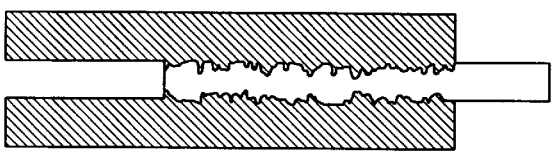
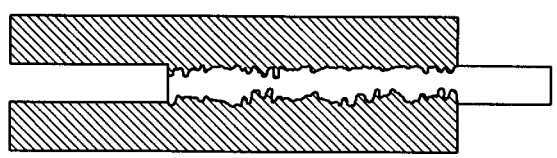
Fig. 1c                Fig. 1d
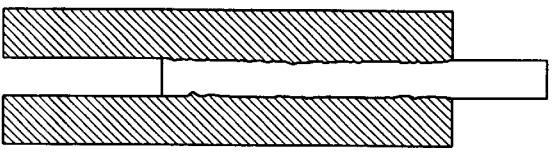
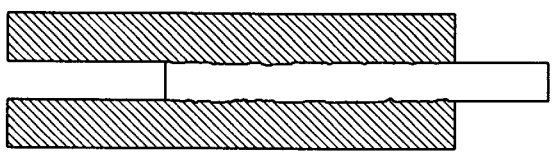
Fig. 2a                Fig. 2b
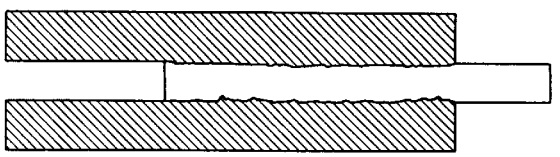
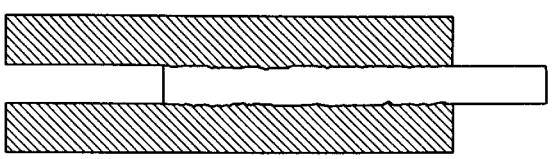
Fig. 2c                Fig. 2d

BLEED ALLEVIATION BETWEEN TWO INKS

TECHNICAL FIELD

The present invention relates to inks employed in ink-jet printing, especially in thermal ink-jet printing, and, more particularly, to colored and black ink compositions in which color bleed is substantially reduced or even eliminated.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area fill, and provides other print capabilities on the medium.

Many thermal ink-jet inks, when printed in various colors on bond paper, copier paper, and other media, can lead to bleed. The term "bleed", as used herein, is defined as follows: When inks of two different colors are printed next to each other, it is desired that the border between the two colors be clean and free from the invasion of one color into the other. When one color does invade into the other, the border between the two colors becomes ragged, and this is bleed.

This is in contradistinction to uses of the term in the prior art, which often defines "bleed" in the context of ink of a single color following the fibers of the paper.

Prior solutions to bleed have largely involved the use of heated platens or other heat sources or the use of a separate fixer solution to pre-coat the paper and/or special paper. Heated platens add cost and complexity to the printer. Fixing solutions also add cost and additional liquid to be dispensed. Special paper limits the user to a small, select group of papers that are more expensive than a "plain" paper.

A need remains for ink compositions for use in ink-jet printing, particularly thermal ink-jet printing, which do not evidence bleed, as defined herein, when printed on plain papers and without the use of heaters or a separate fixer solution to pre-coat the paper, and yet which possess relatively long shelf life and other desirable properties of such inks.

DISCLOSURE OF INVENTION

In accordance with the invention, a set of thermal ink-jet inks for printing at least two different colors on a print medium from an ink-jet pen is provided, with a first ink containing a pigment and an amine-containing dispersant to form a pigment dispersion, the amine-containing dispersant including at least one quaternary amine functional group, and a second ink containing a bleed-alleviating anion that substantially quantitatively combines with the quaternary amine functional group to form a comparatively insoluble quaternary ammonium compound. The amine-containing dispersant is one that is capable of generating a quaternary ammonium ion in the ink, and is referred to herein as a quaternized or neutralized amine dispersant. The bleed-alleviating anion present in an effective amount to cause the dispersant of the first ink to form the insoluble compound on the print medium, thereby destabilizing the pigment dispersion and inhibiting migration of the pigment on the print medium.

The amine-containing dispersant and pigment are used to formulate either the black ink or the color inks. The bleed-alleviating anion is then used in either the color inks or the black ink. Consequently, bleed between black and different colors is reduced. Further, bleed between two different colors may be reduced by incorporating the amine-containing dispersant and pigment in one ink and the bleed-alleviating anion in the other ink.

The bleed-alleviating anion is one that substantially quantitatively combines with quaternary amines, such as $ClO_4^-$, $PF_6^-$, and $BF_4^-$, to form the insoluble compound.

A method of printing is also provided, comprising printing the two inks adjacent each other.

BRIEF DESCRIPTION OF THE DRAWINGS

FIGS. 1a–d are line drawings representative of printing black ink and magenta ink in an adjacent pattern, comparing the results of black to magenta color bleed for four paper types, where the black ink contains a quaternary ammonium ion generating dispersant and the magenta ink contains no bleed-alleviating anion; and FIGS. 2a–d are line drawings representative of printing black ink and magenta ink in the same adjacent pattern as in FIGS. 1a–d, comparing the results of black to magenta color bleed for the same four paper types, where the black ink contains a quaternary ammonium ion generating dispersant and the magenta ink contains the bleed-alleviating anion of the present invention.

BEST MODES FOR CARRYING OUT THE INVENTION

It is known that certain anions will substantially quantitatively combine with quaternary amine cations to form insoluble compounds in solution. Without subscribing to any particular theory, Applicants believe that by forcing a colorant to become insoluble on the page, then migration of the colorant will be inhibited, thereby helping to reduce bleed between different colors. The method used to force the colorant out of solution is to contact the ink containing the amine-containing dispersant (a quaternized or neutralized amine dispersant, also known as a quaternary ammonium ion generating dispersant) that is sensitive to anions with another ink having an appropriate anion. Examples of such anions include $ClO_4^-$, $PF_6^-$, and $BF_4^-$. These anions are called "bleed-alleviating anions" herein.

While in general any of the inks in an ink-jet ink set (cyan, yellow, magenta, black) could comprise a quaternary ammonium ion generating dispersant ink, preferably, the black ink includes this dispersant, with the color inks containing the bleed-alleviating anion. It is desired that the black ink be a high print quality ink that does not bleed with the colors (cyan, yellow, and magenta). On the other hand, use of the quaternary ammonium ion generating dispersant in the color inks, with the bleed-alleviating anion in the black ink or in one or more of the other color inks, is also contemplated by the invention.

The quaternary ammonium ion generating dispersant ink that is employed in the practice of the present invention is sensitive to certain anions and has a formulation given by:

about 0.1 to 30 wt % of at least one first organic solvent;

about 1 to 5 wt % of at least one pigment;

about 1 to 10 wt % at least one quaternary ammonium ion generating dispersant; and the balance water, and having a pH in the range of about 2.5 to 10.

The organic solvents used for the pigmented ink are often termed "low vapor pressure solvents", by which is meant a solvent having a vapor pressure that is lower than that of water. Low vapor pressure solvents can include, but are not restricted to, glycols such as ethylene glycol, diethylene glycol, triethylene glycol, tetraethylene glycol, propylene glycol, polyethylene glycol, polypropylene glycol, and derivatives thereof; diols such as propanediol, butanediol, pentanediol, hexanediol, and homologous diols; glycol esters such as propylene glycol laurate; long chain alcohols such as butyl alcohol, pentyl alcohol, and homologous alcohols; and other solvents such as esters; ketones; lactones such as γ-butyrolactone; lactams such as N-pyrrolidone, 2-pyrrolidone, and N-(2-hydroxyethyl) pyrrolidone; and glycerols and their derivatives.

Preferred organic solvents for the pigment-containing ink include 2-methyl-2-(hydroxymethyl)-1,3-propanediol (MHPD), available from Aldrich Chemical (Milwaukee, Wis.), an ethoxylated glycerol, such as an ethoxylated glycerol having an average of 26 ethylene oxide units per glycol unit, available from Lipo Chemical as Liponics® EG1 (Paterson, N.J.), 2-pyrrolidone, 1,5-pentanediol, and diethylene glycol.

The term "pigment dispersion", as is known in the art and as used herein, refers to a mixture of a pigment and a dispersing agent. A pigment is a colorant that is applied in an insoluble particulate state. Preferably, the dispersing agent is a polymeric dispersant compound.

Useful pigments for the dispersion comprise a wide variety of organic and inorganic pigments, alone or in combination. The pigment particles are sufficiently small to permit free flow of the ink through the ink jet printing device, especially at the ejecting nozzles that usually have a diameter ranging from 10 to 50 $\mu$m. The range of usefull particle size is approximately 0.005 to 15 $\mu$m. Preferably, the particle size of the pigment in the dispersion should range from 0.005 to 5 $\mu$m and most preferably, from 0.01 to 0.3 $\mu$m.

Representative commercial pigments that may be used in practicing the invention are disclosed in U.S. Pat. No. 5,085,698, issued to S.-H. Ma et al. and assigned to E.I. Du Pont de Nemours, the teachings of which are incorporated herein by reference.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum, and alloys, may be selected for appropriate applications.

The quaternary ammonium ion generating dispersant comprises a dispersant that has at least one quaternary ammonium functional group per dispersant molecule. A tertiary amine functional group is defined as a tertiary amine quaternized with an alkylating reagent or neutralized with an organic or mineral acid. A preferred dispersant comprises an acrylate polymer containing amine functional groups quaternized with an acid, such as phosphoric acid, to a pH of between 3 and 4.

As an example, the quaternary ammonium ion generating pigmented ink employed in the practice of the invention comprises:

15 wt % MHPD;

3 wt % Liponics® EG1;

3.5 wt % carbon black pigment, available from Degussa (Ridgefield Park, N.J.), and 1.75 wt % dispersant, comprising an acrylate polymer containing amines quaternized with phosphoric acid to a pH of between 3 and 4.

The anion-containing ink comprises:

about 0.1 to 30 wt % of at least one second organic solvent;

about 0.1 to 10 wt % of at least one amphiphile;

0 to about 0.3 wt % sodium alginate;

about 0.2 to 10 wt % of at least one colorant;

about 0.01 to 10 wt % bleed-alleviating anion; and the balance water.

The organic solvents used for the anion-containing ink are substantially from the same list as for the quaternary ammonium ion generating pigmented ink, with the addition of the following solvents: mono and di glycol ethers such as cellusolves, including ethylene glycol monobutyl ether, diethylene glycol ethers such as the carbitols, diethylene glycol mono ethyl, butyl, hexyl ethers, propylene glycol ether, dipropylene glycol ether, and triethylene glycol ether.

Preferred organic solvents for the anion-containing ink include 2-ethyl-2-(hydroxymethyl)-1,3-propanediol (EHPD), available from Aldrich Chemical (Milwaukee, Wis.), 2,2-dimethyl-1,3-propanediol (NPG), available from Aldrich Chemical, 2-pyrrolidone, 1,5-pentanediol, and diethylene glycol.

The amphiphile for the anion-containing ink comprises any of the known amphiphiles, including amine oxides and amine sulfonates. Preferred amphiphiles include N-dodecyl-N,N-dimethyl-N-amine oxide (NDAO) (30 wt % aqueous solution), available from Fluka Chemie, AG (Switzerland) and amine perfluoro alkyl sulfonate (25 wt % aqueous solution), available from 3M Co. as FC99 (Minneapolis, Minn.). Amphiphiles are used to control bleed between colors, as disclosed and claimed in U.S. Pat. No. 5,116,409, issued to J. R. Moffatt.

If the pigment/quaternary ammonium ion generating dispersant is used in color inks, with the bleed-alleviating anion in the black ink, no appreciable quantity of amphiphile would be present in the black inks, as this would reduce print quality. In this connection, it is noted that compromising print quality in color inks is not as unacceptable as compromising print quality in black ink, since black ink is employed for text printing, and the requirements for text printing are higher than for color.

Sodium alginate is optionally present to provide brighter colors by limiting penetration of the dye into the print medium and to adjust viscosity of the ink, as disclosed and claimed in U.S. Pat. No. 5,133,803, issued to J. R. Moffatt. Preferably, a low viscosity grade, available from Sigma Chemical Co. (St. Louis, Mo.), is employed.

The bleed-alleviating agent comprises an anion that causes the quaternary ammonium ion generating dispersant to quantitatively precipitate. Examples of such bleed-alleviating anions include $ClO_4^-$, $PF_6^-$, and $BF_4^-$. It appears that there is a special affinity for the quaternary ammonium groups on the pigment dispersant that other simple anions, such as $SO_4^{-2}$, $Cl^-$, $Br^-$, methanesulfonate, and others, lack. It is this special affinity that gives rise to the bleed control.

It should be noted that this effect is not related to a "salting out" of the pigment, but rather a reaction of the anion with the quaternary amine dispersant to produce an insoluble substance. The combination of the quaternary amine dispersant causes destabilization of the pigment dispersion, resulting in inhibition of migration of the pigment on the print medium.

Any of the common counter-ions may be associated with the foregoing anions, such as, but not limited to, $Na^+$, $Li^+$, $K^+$, $Mg^{+2}$, $Fe^{+2}$, $Fe^{+3}$, $Ca^{+2}$, etc., and quaternary ammonium cations having the formula

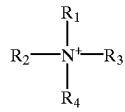

where $R_1$ is H or any straight or branched hydrocarbon comprising saturated or unsaturated chains or aromatic subunits of 18 carbons or less and $R_2$, $R_3$, and $R_4$ are straight or branched hydrocarbons comprising saturated or unsaturated chains or aromatic subunits of 8 carbon atoms or less. An example of a suitable cation is tetramethyl ammonium cation.

The colorants useful in the ink containing the bleed-alleviating anion may be a dye or pigment dispersion. A dye is a colorant that is applied in a soluble state. As indicated above, a pigment is a colorant that is applied in an insoluble particulate state. Although pigments may be used in this anion-containing ink, preferably, water-soluble dyes are employed.

The dyes useful in the practice of the present invention include anionic, cationic, amphoteric, and non-ionic dyes well-known in the art. Anionic dyes are those dyes which, in aqueous solution, yield colored anions and cationic dyes are those which, in aqueous solution, yield colored cations. Typically, anionic dyes contain carboxylic or sulfonic acid groups as the ionic moiety, and encompass all acid dyes. Cationic dyes usually contain quaternary nitrogen groups and encompass all basic dyes. In this connection, it will be appreciated by those skilled in this art that some cationic dyes will be incompatible with the techniques disclosed herein. However, simple experimentation will readily determine which cationic dyes may be employed in the practice of the invention.

The types of anionic dyes most useful in this invention are Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds, and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well-known in the art.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptable dark colors. The dye is present in an amount within the range of 0.2 to 10 wt %.

In the case of organic pigments, the ink may contain up to approximately 1 to 5 wt % pigment.

An example of an anion-containing ink that precipitates amine dispersants has a formulation given by:

about 12.5 wt % EHPD;
about 12.5 wt % NPG;
about 0.1 wt % sodium alginate, low viscosity grade;
about 4 wt % NDAO (30 wt % aqueous solution);
about 0.5 wt % FC99 (25 wt % aqueous solution);
about 5 wt % sodium perchlorate;
about 2.5 wt % water-soluble dye; and
the balance water, and having a pH of 9. Examples of water-soluble dyes suitably employed in the practice of the present invention include, but are not limited to, Acid Blue 9, Direct Blue 199, Direct Yellow 86, Acid Yellow 23, Acid Red 52, Direct Red 227, and Reactive Red 180.

The method of the invention eliminates the requirement of a heater or heated platen in order to reduce bleed from an ink of one color into an ink of another color, the need for fixers, and the need for special paper to control bleed between inks that otherwise would bleed on plain types of paper.

The ink compositions of the present invention also may contain other ingredients. For example, surfactants may be used to alter surface tension as well as maximize penetration (in the bleed-alleviating ink). However, surfactants may destabilize the pigment dispersion or cause an increase in the amount of bleed. Accordingly, the use of surfactants (in the amine-dispersant ink) may tend to negate the advantages offered by the present invention.

Biocides may be used in the ink compositions to inhibit growth of microorganisms, as is well-known in the art. In addition, sequestering agents, such as EDTA, may also be included to eliminate deleterious effects of heavy metal impurities. Other known additives, such as humectants, viscosity modifiers, and other acrylic or non-acrylic polymers made may also be added to improve various properties of the ink compositions as is known in the art.

The ink compositions of the present invention are prepared in the same manner as other ink-jet ink compositions. If a pigment dispersion is used as the colorant, the dispersion is prepared by premixing the selected pigment(s) and dispersant in water. The dispersion step may be accomplished in a horizontal mini mill, a ball mill, a 2-roll mill, an attritor, or by passing the mixture through a plurality of nozzles within a liquid jet interaction chamber at a liquid pressure of at least 5000 psi to produce a uniform dispersion of the pigment particles in the aqueous carrier medium. Other cosolvents may be present during the dispersion step.

If a dye is used as the colorant in the second ink, there is no dispersant present and no need for pigment deaggregation. The dye-based ink is prepared in a well-agitated vessel rather than in dispersing equipment.

EXAMPLES

Example 1

As a control, a black ink containing an quaternary ammonium ion generating dispersant and a magenta ink containing a bleed-alleviating anion are prepared. The black ink comprises 15 wt % 2-methyl-2-(hydroxymethyl)-1,3-propanediol (MHPD) (Aldrich Chemical, Milwaukee, Wis.); 3 wt % Liponics® EG1; 3.5 wt % carbon black pigment (Degussa, Ridgefield Park, N.J.); 1.75 wt % dispersant, comprising an acrylate polymer containing amines quaternized with phosphoric acid to a pH of between 3 and 4, and the balance water. The magenta ink comprises about 12.5 wt % 2-ethyl-2-(hydroxymethyl)-1,3-propane diol (EHPD) (Aldrich Chemical, Milwaukee, Wis.); 2,2-dimethyl-1,3-propanediol (NPG) (Aldrich Chemical); 0.1 wt % sodium alginate, 4 wt % N-dodecyl-N,N-dimethyl-N-amine oxide (NDAO) (30 wt % aqueous solution) (Fluka Chemie, AG, Switzerland); 0.5 wt % FC99 (25 wt % aqueous solution) (3M Co., Minneapolis, Minn.); 2.5 wt % Acid Red 52 dye ($Na^+$ form), CI#45100 (Aldrich Chemical (Milwaukee, Wis.); and the balance water; the pH of this magenta ink is 9.

Vertical bars of black ink intermixed with magenta ink are printed and the results are similar to those shown in FIGS. 1a–d, which were obtained using a set of inks identical in composition above, except that the magenta dye was a proprietary, non-commercial dye. In each of the figures, the magenta ink is represented by the white area within the lined rectangle and the black ink is represented by the black areas, with one bar of magenta ink being printed between two bars of the black ink. Printing was done with a PaintJet® XL300 printer (PaintJet is a trademark of Hewlett-Packard Company), with the heater turned off. This printer employed separate print cartridges, although a single print cartridge with multiple chambers, employed with other printers, could have been used as well.

As can be seen in FIGS. 1a–d, extensive bleed of the black ink into the magenta ink occurred. FIGS. 1a–d are line drawings of the actual result obtained for four different kinds of paper. The papers used were Gilbert Bond (FIG. 1a), Ardor Xerocopy (FIG. 1b), Champion Datacopy (FIG. 1c), and Ardor Bond (FIG. 1d).

Example 2

In this example, 5 wt % of the perchlorate anion (with sodium cation) is added to the magenta ink of Example 1. Otherwise, both inks are identical as in Example 1. Upon printing as in Example 1, virtually no bleed of the black ink into the magenta ink occurs.

The results are similar to those shown in FIGS. 2a–d, which were obtained using a set of inks identical in composition above, except that the magenta dye was the proprietary, non-commercial dye used in FIGS. 1a–d. In each of FIGS. 2a–d, the magenta ink is represented by the white bar and the black ink is represented by the black bars, with one bar of magenta ink being printed between two bars of the black ink. FIGS. 2a–d are line drawings of the actual result obtained for four different kinds of paper. The papers used were Gilbert Bond (FIG. 2a), Ardor Xerocopy (FIG. 2b), Champion Datacopy (FIG. 2c), and Ardor Bond (FIG. 2d).

INDUSTRIAL APPLICABILITY

The method of reducing bleed is expected to find use in ink-jet printing applications involving two or more colors.

Thus, there has been disclosed a method of reducing bleed in printing at least two different colors on a print medium from an ink-jet pen. It will be readily apparent to those skilled in this art that various changes and modifications may be made without departing from the spirit of the invention, and all such changes and modifications are considered to fall within the scope of the invention as defined by the appended claims.

What is claimed is:

1. A set of thermal ink-jet inks for printing at least two different colors on a print medium from an ink-jet pen, with a first ink containing a pigment and an amine dispersant to form a pigment dispersion, said amine dispersant being selected from the group consisting of a quaternized amine dispersant containing at least one quaternized amine functional group and a neutralized amine dispersant containing at least one neutralized amine functional group, and with a second ink containing a bleed-alleviating anion selected from the group consisting of $ClO_4^-$, $PF_6^-$, and $BF_4^-$, said bleed-alleviating anion present in an effective amount to quantitatively combine with said amine dispersant of said first ink to form an insoluble product on said print medium, thereby destabilizing said pigment dispersion and inhibiting migration of said pigment on said print medium.

2. The set of thermal ink-jet inks of claim 1 wherein said first ink comprises:

(a) about 0.1 to 30 wt % of at least one first organic solvent;

(b) about 1 to 5 wt % of at least one pigment;

(c) about 1 to 10 wt % of at least one amine dispersant selected from the group consisting of a tertiary amine quaternized dispersant and a tertiary amine neutralized dispersant; and (d) the balance water, said first ink having a pH within the range of about 2.5 to 10.

3. The set of thermal ink-jet inks of claim 2 wherein said at least one first organic solvent is selected from the group consisting of glycols and derivatives thereof, diols, glycol esters, long chain alcohols, esters, ketones, lactones, lactams, and glycerols and their derivatives.

4. The set of thermal ink-jet inks of claim 3 wherein said at least one first organic solvent is selected from the group consisting of 2-methyl-2-(hydroxymethyl)-1,3-propanediol; ethoxylated glycerol, 2-pyrrolidone, 1,5-pentanediol, and diethylene glycol.

5. The set of thermal ink-jet inks of claim 2 wherein said at least one pigment consists essentially of carbon black.

6. The set of thermal ink-jet inks of claim 2 wherein said at least one amine dispersant consists essentially of an acrylate polymer containing amines neutralized with acid to a pH of between 3 and 4.

7. The set of thermal ink-jet inks of claim 2 wherein said first ink consists essentially of:

(a) about 15 wt % 2-methyl-2-(hydroxymethyl)-1,3-propanediol;

(b) about 3 wt % ethoxylated glycerol;

(c) about 3.5 wt % carbon black pigment;

(d) about 1.75 wt % dispersant, comprising an acrylate polymer containing amine functional groups neutralized with phosphoric acid to a pH of between 3 and 4; and (e) the balance water.

8. The set of thermal ink-jet inks of claim 1 wherein said second ink comprises about 0.1 to 30 wt % of at least one second organic solvent, about 0.1 to 10 wt % of at least one amphiphile, 0 to about 0.3 wt % of an alginate, about 0.2 to 10 wt % of at least one colorant, and about 0.01 to 10 wt % of said bleed-alleviating anion.

9. The set of thermal ink-jet inks of claim 8 wherein said at least one second organic solvent is selected from the group consisting of glycols and derivatives thereof, diols, glycol esters, mono and di glycol ethers, long chain alcohols, esters, ketones, lactones, lactams, and glycerols and their derivatives.

10. The set of thermal ink-jet inks of claim 9 wherein said at least one second organic solvent is selected from the group consisting of 2-ethyl-2-(hydroxymethyl)-1,3-propanediol, 2,2-dimethyl-1,3-propanediol, 2-pyrrolidone, 1,5-pentanediol, and diethylene glycol.

11. The set of thermal ink-jet inks of claim 8 wherein said second ink consists essentially of:

about 12.5 wt % 2-ethyl-2-(hydroxymethyl)-1,3-propanediol, about 12.5 wt % 2,2-dimethyl-1,3-propanediol, about 0.1 wt % sodium alginate, about 4 wt % of a 30 wt % aqueous solution of N-dodecyl-N,N-dimethyl-N-amine oxide, about 0.5 wt % of a 25 wt % aqueous solution of amine perfluoro alkyl sulfonate, about 5 wt % sodium perchlorate, about 2.5 wt % water-soluble dye, and the balance water, and has a pH of about 9.

12. A set of thermal ink-jet inks for printing at least two different colors on a print medium from an ink-jet pen, wherein a first ink consists essentially of:

(a) 15 wt % 2-methyl-2-(hydroxymethyl)-1,3-propanediol;

(b) 3 wt % ethoxylated glycerol;

(c) 3.5 wt % carbon black pigment;

(d) 1.75 wt % dispersant, comprising an acrylate polymer containing amine functional groups neutralized with phosphoric acid to a pH of between 3 and 4; and (e) the balance water, and wherein a second ink consists essentially of:

(a) about 12.5 wt % 2-ethyl-2-(hydroxymethyl)-1,3-propanediol;

(b) about 12.5 wt % 2,2-dimethyl-1,3-propanediol;

(c) about 0.1 wt % sodium alginate;

(d) about 4 wt % of a 30 wt % aqueous solution of N-dodecyl-N,N-dimethyl-N-amine oxide;

(e) about 0.5 wt % of a 25 wt % aqueous solution of amine perfluoro alkyl sulfonate;

(f) about 5 wt % sodium perchlorate;

(g) about 2.5 wt % water-soluble dye; and (h) the balance water, and has a pH of about 9.

13. A method of reducing bleed in printing at least two different colors on a print medium from an ink-jet pen, comprising, in either order, the steps of: (a) printing on said print medium a first ink containing a pigment and an amine dispersant to form a pigment dispersion, said amine dispersant being selected from the group consisting of a quaternized amine dispersant containing at least one quaternized amine functional group and a neutralized amine dispersant containing at least one neutralized amine functional group, and (b) printing adjacent thereto a second ink containing a bleed-alleviating anion selected from the group consisting of $ClO_4^-$, $PF_6^-$, and $BF_4^-$, said bleed-alleviating anion present in an effective amount to quantitatively combine with said dispersant of said first ink to form an insoluble product on said print medium, thereby destabilizing said pigment dispersion and inhibiting migration of said pigment on said print medium.

14. The method of claim 13 wherein said first ink comprises:

(a) about 0.1 to 30 wt % of at least one first organic solvent;

(b) about 1 to 5 wt % of at least one pigment;

(c) about 1 to 10 wt % of at least one amine dispersant selected from the group consisting of a tertiary amine quaternized dispersant and a tertiary amine neutralized dispersant; and (d) the balance water, said first ink having a pH within the range of about 2.5 to 10.

15. The method of claim 14 wherein said at least one first organic solvent is selected from the group consisting of glycols and derivatives thereof, diols, glycol esters, long chain alcohols, esters, ketones, lactones, lactams, and glycerols and their derivatives.

16. The method of claim 14 wherein said at least one first organic solvent is selected from the group consisting of 2-methyl-2-(hydroxymethyl)-1,3-propanediol, ethoxylated glycerol, 2-pyrrolidone, 1,5-pentanediol, and diethylene glycol.

17. The method of claim 14 wherein said at least one pigment is consists essentially of carbon black.

18. The method of claim 14 wherein said at least one amine dispersant consists essentially of an acrylate polymer containing amines neutralized with acid to a pH of between 3 and 4.

19. The method of claim 14 wherein said first ink consists essentially of:

(a) about 15 wt % 2-methyl-2-(hydroxymethyl)-1,3-propanediol;

(b) about 3 wt % ethoxylated glycerol;

(c) about 3.5 wt % carbon black pigment;

(d) about 1.75 wt % dispersant, comprising an acrylate polymer containing amine functional groups neutralized with phosphoric acid to a pH of between 3 and 4; and (e) the balance water.

20. The method of claim 19 wherein said second ink consists essentially of:

about 12.5 wt % 2-ethyl-2-(hydroxymethyl)-1,3-propanediol, about 12.5 wt % 2,2-dimethyl-1,3-propanediol, about 0.1 wt % sodium alginate, about 4 wt % of a 30% aqueous solution of N-dodecyl-N,N-dimethyl-N-amine oxide, about 0.5 wt % of a 25% aqueous solution of amine perfluoro alkyl sulfonate, about 5 wt % sodium perchlorate, about 2.5 wt % water-soluble dye, and the balance water, and has a pH of about 9.

21. The method of claim 13 wherein said second ink comprises about 0.1 to 30 wt % of at least one second organic solvent, about 0.1 to 10 wt % of at least one amphiphile, 0 to about 0.3 wt % of an alginate, about 0.2 to 10 wt % of at least one colorant, and about 0.01 to 10 wt % of said bleed-alleviating anion.

22. The method of claim 21 wherein said at least one second organic solvent is selected from the group consisting of glycols and derivatives thereof, diols, glycol esters, mono and di glycol ethers, long chain alcohols, esters, ketones, lactones, lactams, and glycerols and their derivatives.

23. The method of claim 22 wherein said at least one second organic solvent is selected from the group consisting of 2-ethyl-2-(hydroxymethyl)-1,3-propanediol, 2,2-dimethyl-1,3-propanediol, 2-pyrrolidone, 1,5-pentanediol, and diethylene glycol.

24. A thermal ink-jet ink for printing on a print medium from an ink-jet pen, said ink containing a pigment and an amine dispersant to form a pigment dispersion, said amine dispersant being selected from the group consisting of a quaternized amine dispersant containing at least one quaternized amine functional group and a neutralized amine dispersant containing at least one neutralized amine functional group, said amine dispersant adapted to quantitatively combine with a bleed-alleviating anion selected from the group consisting of $ClO_4^-$, $PF_6^-$, and $BF_4^-$ contained in another ink to form an insoluble product on said print medium, thereby destabilizing said pigment dispersion and inhibiting migration of said pigment on said print medium.

25. The thermal ink-jet ink of claim 24 wherein said at least one quaternary amine functional group substantially quantitatively combines with said bleed-alleviatiating anion.

* * * * *